(12) United States Patent
Kimura et al.

(10) Patent No.: US 7,611,246 B2
(45) Date of Patent: Nov. 3, 2009

(54) PROJECTION DISPLAY AND OPTICAL INTEGRATOR

(75) Inventors: Nobuyuki Kimura, Yokohama (JP); Kentaro Kato, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 11/480,388

(22) Filed: Jul. 5, 2006

(65) Prior Publication Data

US 2007/0008494 A1 Jan. 11, 2007

(30) Foreign Application Priority Data

Jul. 5, 2005 (JP) ............... 2005-195658

(51) Int. Cl.
*G03B 21/14* (2006.01)
*G02B 27/10* (2006.01)

(52) U.S. Cl. ............ 353/38; 353/20; 359/619; 359/621

(58) Field of Classification Search ........... 353/38, 353/31, 34, 37, 20; 349/5, 7, 8, 9; 359/710, 359/621, 622, 623, 624; 362/215, 333
See application file for complete search history.

(56) References Cited

U.S. PATENT DOCUMENTS

| | | | |
|---|---|---|---|
| 6,092,901 A | 7/2000 | Hashizume et al. | |
| 6,273,569 B1 | 8/2001 | Iechika et al. | |
| 6,386,709 B1 * | 5/2002 | Seki | 353/38 |
| 6,552,760 B1 * | 4/2003 | Gotoh et al. | 349/56 |
| 7,011,412 B2 | 3/2006 | Ogawa et al. | |
| 2002/0180933 A1* | 12/2002 | Ito | 353/20 |
| 2003/0174294 A1* | 9/2003 | Yanagisawa | 353/85 |
| 2004/0165151 A1* | 8/2004 | Kitabayashi et al. | 353/30 |

FOREIGN PATENT DOCUMENTS

| | | |
|---|---|---|
| JP | 6-180444 | 6/1994 |
| JP | 10-171045 | 6/1998 |
| JP | 11-281923 | 10/1999 |
| JP | 2000-194068 | 7/2000 |
| JP | 2003-287719 | 10/2003 |

* cited by examiner

*Primary Examiner*—William C Dowling
*Assistant Examiner*—Ryan Howard
(74) *Attorney, Agent, or Firm*—Antonelli, Terry, Stout & Kraus, LLP.

(57) ABSTRACT

A projection display makes it possible to minimize the costs of a polarization conversion element, and concurrently makes it possible to improve illuminance nonuniformity and optical utilization efficiency and to accomplish physical apparatus compactness. An optical integrator used in the projection display is configured such that, in comparison to the number of arrangements of polarization conversion units in a predetermined direction, a split number of an array lens in the same direction is greater.

11 Claims, 3 Drawing Sheets

PROJECTION DISPLAY AND OPTICAL INTEGRATOR

The present application claims priority from Japanese application JP2005-195658 filed on Jul. 5, 2005, the content of which is hereby incorporated by reference into this application.

BACKGROUND OF THE INVENTION

Field of the Invention

The present invention relates to polarizing conversion elements, and more specifically, to a projection display and an optical integrator, in which the projection display makes it possible to minimize the costs of a polarization conversion device incorporated in the optical integrator including a pair of array lenses to thereby constitute a polarization conversion integrator, and concurrently makes it possible to improve optical utilization efficiency, illuminance uniformity, and illuminance ratio.

In an illumination distribution of surfaces of radiation light fluxes from a light source used for a projection display, there occurs circular dark spots developed in the vicinity of the optical axis in association with by shades of discharge lamp tubes of the light source or openings in reflector central position of the light source. In the case that the radiation light is directly incident on the light bulb element, such a circular dark spot as described above appears also on an obtained projection image in the vicinity of the optical axis, thereby creating images with nonuniform illumination distribution. Conventionally known techniques include those of the type that uses an optical integrator including two array lenses to reduce such shades and to equalize the illumination distribution over to a peripheral portion of the image. Techniques of this type are described in Japanese Unexamined Patent Application Publications No. 10-171045 and No. 11-281923, for example.

Especially in the case where an LC (liquid crystal) panel is used as the image display element, a so-called polarization conversion integrator system configured by combining a polarization conversion device with the optical integrator having a polarization conversion function is used to enhance the optical utilization efficiency. In the polarization conversion function, polarization beam separation is performed by using polarization beam splitter films, which are alternately formed on interfaces of a plurality of parallelogram-columnar light transmissive members disposed in the form of an array, and reflection films, and light is emanated by being converted to a predetermined polarized wave by half-wavelength retardation plates provided on the one emanation side of polarized light. Techniques of this type are described in Japanese Unexamined Patent Application Publication No. 10-171045, for example. Techniques related to the polarizing conversion elements are described in Japanese Unexamined Patent Application Publication No. 2003-287719, for example.

SUMMARY OF THE INVENTION

Projection LC displays employing the conventional polarization conversion integrator have problems as described hereinbelow, however.

In the projection LC display using the polarization conversion integrator, light radiated from a lamp bulb is reflected off, for example, a reflector with a paraboloidal surface (paraboloidal reflector) to be parallel to the illumination optical axis, and is then incident on a first array lens. The first array lens splits the incident light into a plurality of rays of light through a plurality of lens cells arranged in the form of a matrix, and then guides the light to pass through a second array lens and the polarization conversion device. More specifically, the first array lens is designed such that the respective lamp and the respective lens cell of the second array lens have an object-image interrelationship (optically conjugated relationship). The first array lens has the same aspect ratio as the LC panel. The second array lens, which has the plurality of lens cells arranged in a matrix, projects onto the LC display elements the profiles of the lens cells of the first array lens which correspond to the respective constituent lens cells of the first array lens. In this event, the polarization direction of light input from the second array lens is converted by the polarization conversion device to a predetermined polarization direction, and then projection images of the respective lens cells of the first array lens are superposed over the image display elements through a collimator lens and a condenser lens. The collimator lens and the second array lens disposed closed to the collimator lens are designed to have an object-image interrelationship (optically conjugated relationship). As such, the light split by the first array lens into the plurality of split light fluxes are superposed over the image display element, whereby illumination with an illumination distribution having uniformity at a high level causing no practical problems can be accomplished.

The corner-to-corner length of the display size of the image display element is denoted by si, the corner-to-corner length of the respective lens cell of the first array lens is denoted by bi, the distance between the first and second array lenses is denoted by $L1i$, and the distance between the collimator lens and the image display element is denoted by $L2i$.

As described above, the second array lens (400) and the collimator lens disposed close thereto are designed so that the respective lens cells of the first array lens and the image display element have the optically conjugated relationship, in which light flux parallel to the illumination optical axis is received from the paraboloidal reflector, and the profile of the respective lens cell of the first array lens are imaged on the image display element. As such, a scale factor si/bi of the lens cell image is approximately expressed as equation 1 given below.

Thus, the size of an irradiation effective area formed on the image display element is substantially proportional to the size of an optical image of the lens cell of the first array lens.

$$si/bi \approx L2i/L1i \quad (1)$$

If the size si of the image display element is determined, then the distance $L2i$ from the collimator lens to the image display element is substantially uniquely determined. Accordingly, parameters of the illumination optical system are the corner-to-corner length bi of the respective lens cell of the first array lens, and the distance $L1i$ between the first and second array lenses.

If an outer profile size of the reflector is determined, then the outer profile size of the first array lens is uniquely determined as well. In the case that a split number (or, "cell split number," hereafter) of the first array lens is reduced and the corner-to-corner length bi of the respective lens cell is increased (that is, the cell size is increased), then an illuminance distribution of light passing through the respective cells becomes nonuniform. Consequently, also the illuminance on the LCD element over which the light passed through the respective cells is superposed becomes nonuniform. In addition, according to the equation 1, in the case that the corner-to-corner lengths of the respective lens cells are large, the distance $L1i$ between the first and second array lenses is increased, so that the light pass efficiency in the polarizing conversion element (500b) is reduced. This is attributed to the fact that a light source image of the lamp which is formed immediately after the second array lens is magnified by the first array, such that a light pass efficiency in the polarization conversion device is reduced. In the case that the corner-to-corner length bi of the respective lens cell of the first array lens is large, also the size of the projection display has to be increased. However, in the case that the split number of the first array lens is reduced, the number of columns in the polarization conversion device corresponding thereto is reduced, whereby the costs of the polarization conversion device are reduced.

In contract, in the case that the split number of the first array lens is increased and the corner-to-corner length bi of the respective lens cell is reduced (that is, the cell size is reduced), then an illuminance distribution of light passing through the respective cells becomes uniform. Consequently, also the illuminance on the LCD element (18), over which the light passed through the respective cells is superposed, becomes uniform. In addition, according to the equation 1, the distance $L1i$ between the first and second array lenses is reduced, and the light pass efficiency in the polarizing conversion element is improved. This is attributed to the fact that a light source image of the lamp which is formed immediately after the second array lens is demagnified by the first array, such that the light pass efficiency in the polarization conversion device is improved. In the case that the corner-to-corner length bi of the respective lens cell of the first array lens is small, the projection display can be compacted. However, in the case that the split number of the first array lens is increased, the number of columns in the polarization conversion device corresponding thereto is reduced, whereby the costs of the polarization conversion device are increased.

Nevertheless, however, in any one of the conventional techniques, in the case that the number of columns in the polarization conversion device is reduced to reduce the costs, the split number of the array lens is small, thereby to lead to degradation in the illuminance uniformity and to increase in the physical apparatus size. In addition, in the case that the split number of the array lens is increased to improve the illuminance uniformity and the optical utilization efficiency and to accomplish physical compactness of the projection display, the number of columns in the polarization conversion device is increased, thereby increasing the costs.

An object of the present invention is to provide a projection display that, while making it possible to minimize the costs of polarization conversion device, makes it possible to improve illuminance uniformity and optical utilization efficiency and to accomplish physical apparatus compactness.

One aspect of the present invention is an optical integrator configured in a manner that, in comparison to the number of arrangement of polarization conversion units of a polarization conversion device of a projection display, the split number of an array lens in the same direction is greater.

BRIEF DESCRIPTION OF THE DRAWINGS

In the accompanying drawings.

DETAILED DESCRIPTION OF THE PREFERRED EMBODIMENTS

Preferred embodiments of the present invention will be described hereinbelow with reference to the drawings. Like numerals or characters refer to like or corresponding to portions throughout the respective drawing figures, and descriptions once provided will not be repeated.

Figure 2:
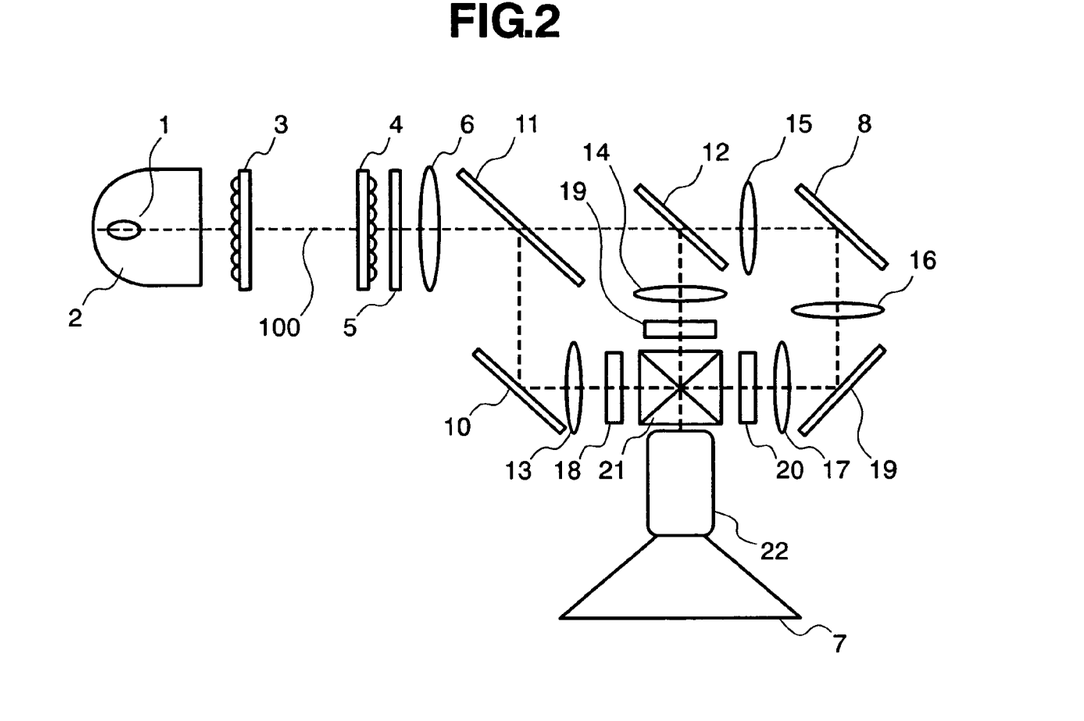
FIG. 2 is a schematic view of the configuration of an optical system of a projection display.

FIG. 2 is a schematic view of the configuration of an optical system of a projection LC display using a polarization conversion integrator of a one embodiment according to the present invention. With reference to FIG. 2, a lamp 1 is a white light, such as an ultrahigh pressure mercury lamp, a metal halide lamp, a mercury xenon lamp, or a halogen lamp. A reflector 2 has a reflective surface in a revolution-paraboloidal shape and has a circular or polygonal emanative surface. Light radiated from the lamp 1 is led to pass through LC display elements 18 to 20, which are light valves, is directed to a projection lens 22, and is projected onto a screen 7.

The light radiated from the lamp 1 is reflected off the reflector 2, for example, which has the revolution-paraboloidal shape, to be parallel to an illumination optical axis 100, the illumination optical axis 100, and is incident on the polarization conversion integrator.

The polarization conversion integrator is configured to include an optical integrator that is formed of a first array lens 3 and a second array lens 4 and that performs uniform illumination, and a polarization conversion element 5 (described in more detail below), that converts a polarization direction to a predetermined polarization direction.

The first array lens 3 is formed such that, as viewed from the direction of the illumination optical axis 100, a plurality of lens cells each having a rectangular profile substantially analogous to the LC display element are arrayed in a matrix (two-dimensional array). Thereby, the first array lens 3 splits light input from into a plurality of light fluxes through the plurality of lens cells, and efficiently guides the light fluxes to the second array lens 4 and the polarization conversion element 5. More specifically, the first array lens 3 is designed to provide the optically conjugated relationship between the lamp 1 and the respective lens cell of the second array lens 4.

Similarly as the first array lens 3, the second array lens 4 is configured such that, as viewed from the direction of the illumination optical axis 100, a plurality of lens cells are disposed in a matrix projects (maps). The second array lens 4 projects (maps) the profiles of the lens cells of the first array lens 3, which respectively correspond to the constituent lens cells of its own, onto the LC display elements 18 to 20.

In this case, the polarization direction of the light flux incident from the second array lens 4 is converted by the polarization conversion element 5 to the predetermined polarization direction. Then, projection images of the respective lens cells of the first array lens 3 are superposed over the LC display elements 18 to 20 through a collimator-lens 6, condenser lenses 13 and 14, a first relay lens 15, a second relay lens 16, and a third relay lens 17.

The second array lens 4 and the collimator lens 6 disposed close thereto are designed so that the respective lens cells of the first array lens 3 and the image display elements have the optically conjugated relationship. As such, the light flux split into the plurality of light fluxes through the first array lens 3 is superposed and displayed onto the LC display elements 18 to 20 through the second array lens 4 and the collimator lens 6, whereby illumination with an illumination distribution having uniformity at a high level causing no practical problems can be accomplished.

As described above, the polarization conversion integrator, which is configured of the first and second array lenses 3 and 4 and the polarization conversion element 5, is capable of uniformly illuminating the LC display elements while converting the light having random polarization direction into a predetermined polarization direction.

In this stage, for example, B light (blue bandwidth light) is reflected off a dichroic mirror 11; and G light (green bandwidth light) and R light (red bandwidth light) are transmitted and split into two color rays of light therethrough, and G and R light are further split into G and R light by a dichroic mirror 12. For example, G light is reflected off the dichroic mirror 12, and R light is transmitted through the dichroic mirror 12, thereby to split the light into three color light fluxes. Various manners are contemplated for the method of splitting the light. For example, the light may be split in such a manner that R light is reflected off the dichroic mirror 11, and G and B light are transmitted therethrough; or alternately, the method may be G light is reflected off the dichroic mirror 11, and R and B light are transmitted therethrough.

The B light reflected off the dichroic mirror 11 is further reflected off a reflecting mirror 10, is transmitted through the LC display element 18 through the condenser lens 13, and is then incident on a photosynthesis prism 21. Of the G and R light transmitted through the dichroic mirror 11, the G light is reflected off the dichroic mirror 12, is incident on the LC display element 19 through the condenser lens 14, and is then incident on the photosynthesis prism 21. The R light is transmitted through the dichroic mirror 12, is collimated through the first relay lens 15, is further reflected off a reflecting mirror 8, and is further collimated through the second relay lens 16, and is reflected off a reflecting mirror 9. Then, the R light is further collimated through the third relay lens 17 and is incident on the LC display element 20 dedicated for R light. The R light transmitted through the LC display element 20 is then incident on the photosynthesis prism 21.

The B, G, and G light transmitted through the respective image display elements 18 to 20 are synthesized by the photosynthesis prism 21 into a colored image, and then reach the screen 7 through the projection lens 22, which is like a zoom lens. Optical images formed on the LC display elements 18 to 20 through light intensity modulation are magnified and projected on the screen, thereby to function as displays.

Meanwhile, while no relay lens is used in a first optical path (for B light) and a second optical path (for G light), a relay lens for equalizing the optical path lengths for B and G light with one another is used in a third optical path (for R light).

Figure 1A:
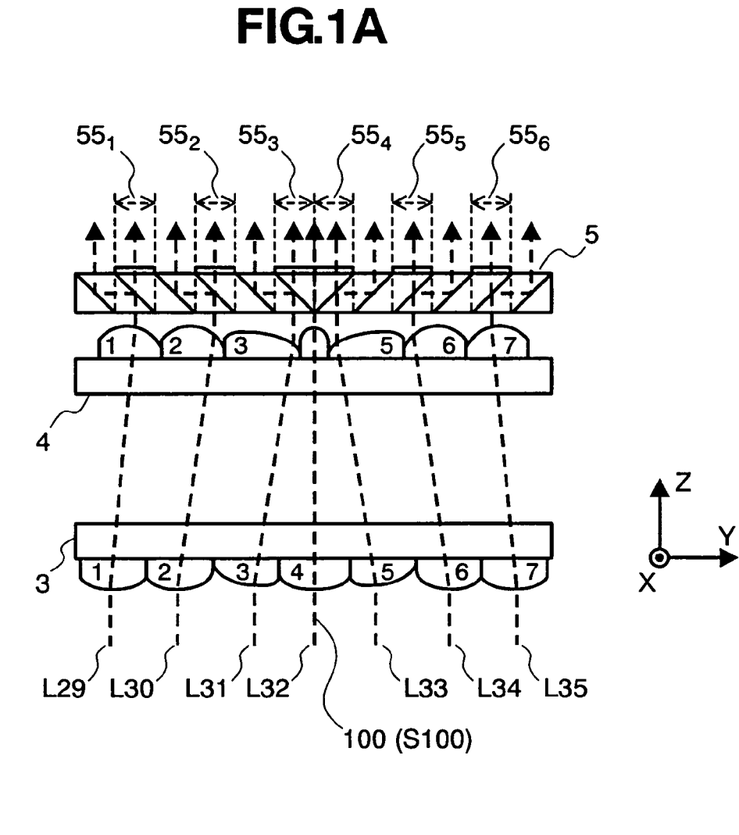
FIGS. 1A and 1B are enlarged views of an example configuration of an essential portion of a polarization conversion integrator.
Figure 1B:
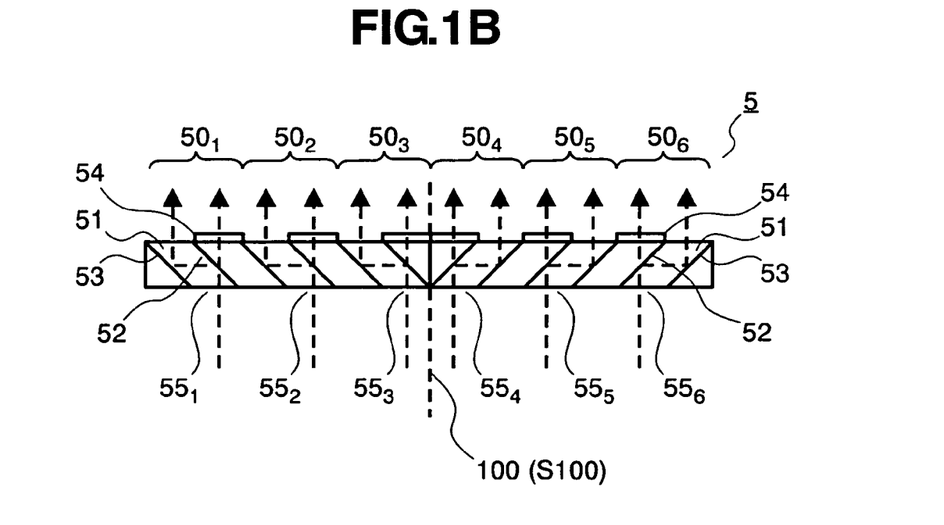

With reference to FIG. 1, the following describes reasons that the present embodiment minimizes the costs of polarization conversion element 5, and concurrently improves the illuminance uniformity and optical utilization efficiency and compacts the image display.

FIG. 1A is an enlarged view of an essential portion of the polarization conversion element 5 according to the present embodiment. FIG. 1B is an enlarged detail view of the polarization conversion element 5.

In description, a rectangular coordinate system will be used for the sake of gravity. The axis along the direction of the illumination optical axis 100 is defined to be the Z axis. The axis in the direction parallel to the long side of a rectangular illumination effective region of the LC display element is defined to be the Y axis. The axis in the direction parallel to a cross-sectionally short side ("short side," hereafter) narrow-side length of a rectangular illumination effective region of the LC display element is defined to be the X axis (perpendicular to the paper surface of FIG. 1). The constituent lens cells of the first array lens 3 and the second array lens 4 are arranged in both the X-axis and Y-axis directions. FIG. 1 is a top view of the polarization conversion integrator as viewed from the X-axis direction.

First, before describing the reasons, the configuration of the polarization conversion element 5 will be described hereinbelow. With reference to FIG. 1B, the polarization conversion element 5 is configured to include a plurality of light transmissive members 51, polarizing beam splitter ("PBS," hereinafter) films 52, and reflection films 53. The light transmissive members 51 have, for example, a parallelogram columnar shape extending along the X-axis direction (perpendicular to the paper surface of FIG. 1), which is parallel to the short side of the LC display element are arranged in the form of multiple arrays along the Y-axis direction in parallel to the plane (X-Y plane) perpendicular to the direction of the illumination optical axis 100 (Z-axis direction). The PBS films 52 and the reflection films 53 are formed in the form of an array and alternately on interfaces between the adjacent light transmissive members 51. Further, half-wavelength retardation plates 54 are provided on an emanative surface for emanating light passed through an opening portion 55 on the incident side of the polarization conversion element 5 and transmitted through the PBS films 52.

The polarization conversion element 5 is formed symmetric with respect to a plane S100 formed with the illumination optical axis 100 and an extensional direction (X-axis direction) of the parallelogram-columnar light transmissive member 51 (which plane is an X-Y plane including the illumination optical axis 100 and will hereafter referred to as "optical axis plane" for the for the sake of convenience). The respective light transmissive member 51 is tilted 45 degrees in the upper right direction with respect to the optical axis plane S100 on the right hand side of the FIG. 1, and is tilted 45 degrees in the lower right direction with respect to the optical axis plane S100 on the left hand side of the FIG. 1. The order of the PBS films 52 and the reflection films 53 is symmetric with respect to the optical axis plane S100. More specifically, the films are formed in the order as PBS film, reflection film, PBS film, reflection film, ... toward the right hand side from the illumination optical axis 100 on the right hand side of the FIG. 1 with respect to the optical axis plane S100. Also, the films are formed in the order as PBS film, reflection film, PBS film, reflection film, ... toward the left hand side from the illumination optical axis 100 on the right hand side of the FIG. 1 with respect to the optical axis plane S100.

Of light L (L') having been incident on one of the opening portions 55 (opening portion 55$_6$, for example) through the first array lens 3 (300) and the second array lens 4 (400) on the polarization conversion element 5 configured as described above, light such as light of S-polarization (or, P-polarized light) is reflected off the PBS film 52, is reflected off the opposing reflection film 53, and then is emanated with the S-polarization (or, P-polarized light).

Light of the P-polarization (or, S-polarized light) is passed through the PBS films 52 and then is converted to S-polarization (or, P-polarized light) by the half-wavelength retardation plate 54 of the radiation surface, thereby being emanated. The polarization conversion element 5 has the configuration in which a plurality of polarization conversion units 50 (six units in the example shown in FIG. 1, for example), which are basic components, are arranged in the Y-axis direction, thereby having a polarization conversion function that converts the polarization direction of incident light to a predetermined polarization direction and thereby outputs the light. When designating a polarization conversion unit 50 or opening portion 55, it will be designated with the reference numeral affixed with any one of numerals 1 to 6 counted from the left end side of FIG. 1.

The aforementioned reasons will now be described herebelow.

In the present embodiment, the polarization conversion element 5 identical to the one in the conventional technique can be used to minimize the costs of the polarization conversion element 5. As shown in FIG. 12 in Japanese Unexamined Patent Application Publication No. 2003-287719, the polarization conversion device is formed in the manner that, for example, sheet glasses each provided with, for example, a PBS film and a reflection film formed on respective two (both) sides, and sheet glasses each provided nothing formed thereon are alternately bonded. As such, an increased number of bonded sheet glasses results in a cost increase. From this viewpoint, in the present case, a configuration including six polarization conversion units 50, which are basic components, is used. In this case, since the polarization conversion units 50 are symmetric with respect to the optical axis plane S100, the number of the polarization conversion units 50 is an even number.

In addition, as shown in FIG. 1A, for the first array lens 3 and the second array lens 4, the respective cell sizes are reduced and the split number is increased in order to obtain even more uniform radiation light fluxes. Thereby, the number of columns is set to an odd number by increasing one column to the number of columns in the conventional device (in the present example, the number of columns is set to 7 by adding to 6 that represents the number of the polarization conversion units). The number of columns refers to a number of columns in the direction of a cross-sectionally long side ("long side," hereafter and corresponding to the Y-axis direction) of the illumination effective region of the LC display element. In addition, even in the case that the number of columns is increased by one, since the array lens is molded by using a metallic die, the costs do not so significantly increased in comparison to the conventional.

With the increase in the number of columns, the configuration has a feature in that a fourth lens cell column (center column) of each of the first and second array lenses 3 and 4 is located on the optical axis plane S100 in the fourth column portion counted from the left hand side of the FIG. 1. Then, optical axis positions and profiles of respective lens cells of the first array lens 3 and profiles of respective lens cells of the second array lens 4 are determined so that light fluxes passing through the central three columns (third to fifth lens cell columns from the left hand side of the FIG. 1) of the second array lens 4 are incident on two central columns in the polarization conversion element 5. The optical axis position of the respective lens cell of the array lens refers to an axis position representing a lens curvature center of the respective lens cell. In description herebelow, the optical axis will be referred to as "curvature center axis" to avoid confusion with the illumination optical axis.

According to the configuration in which the split number is increased and the respective lens cells of the first array lens 3, the distance between the first and second array lenses 3 and 4 can be reduced in accordance with the equation 1. Thereby, the illuminance uniformity and the optical utilization efficiency are improved.

As describe above, according to the present embodiment of the present invention, while the costs of the polarization conversion element 5 are minimized, the illuminance uniformity and the optical utilization efficiency are improved, and the physical compactness of the image display can be accomplished.

Thus, by reference to the optical diagrams, the above has described the method that minimizes the costs of the polarization conversion device, and concurrently improves the illuminance uniformity and the optical utilization efficiency and compacts the image display in comparison the conventional case. Next, profiles and curvature center axes of the first and second array lens and the second array lenses 3 and 4 according to the present embodiment will be described herebelow. According to the present embodiment, the number of columns in the array lens is seven, and the number of columns in the polarization conversion units 50 that constitute the polarization conversion element 5 is 6.

Figure 3:
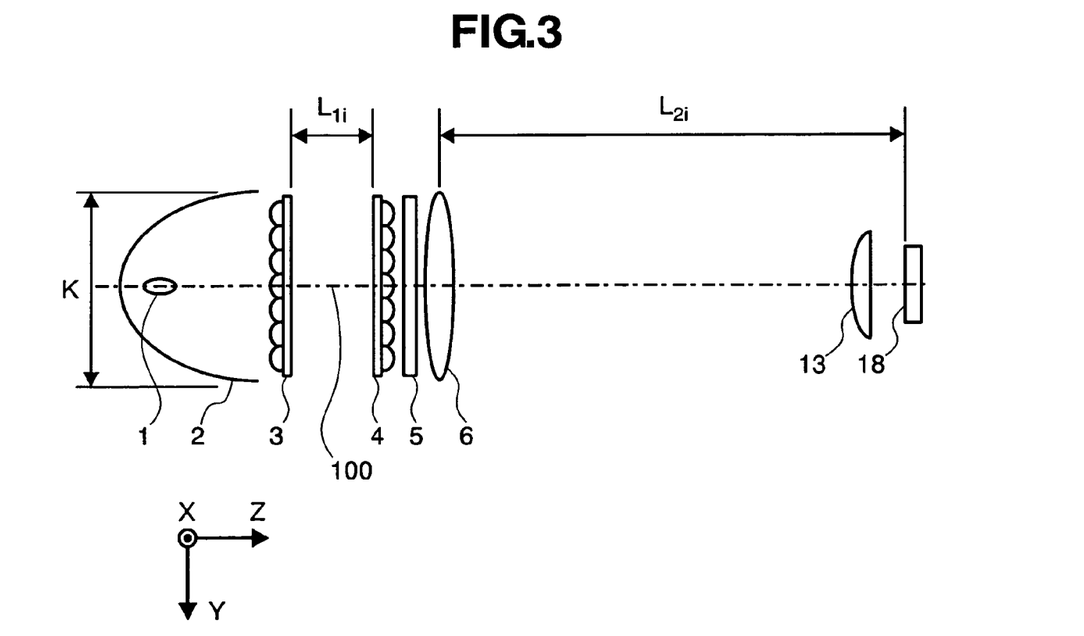
FIG. 3 is a schematic view of an illumination optical system using the polarization conversion integrator.
Figure 4:
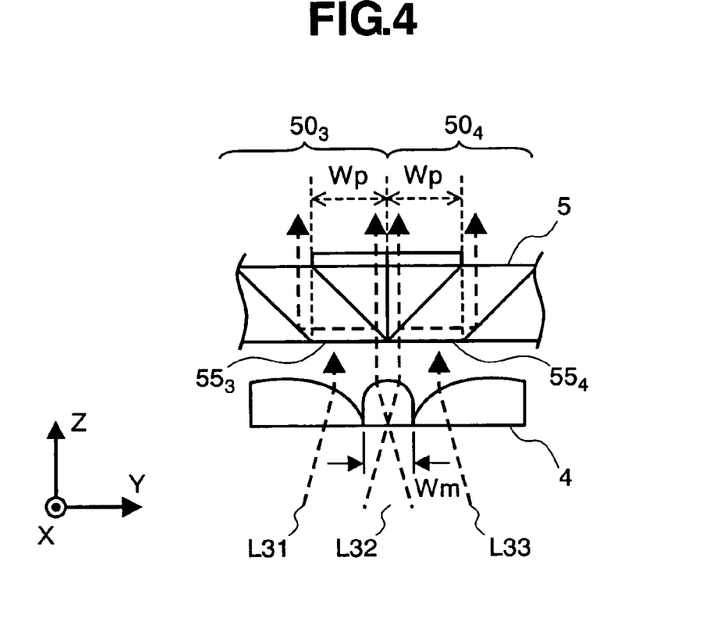
FIG. 4 is an enlarged view showing optical paths of light rays incident on central columns in a first array lens in the polarization conversion integrator.
Figure 5:
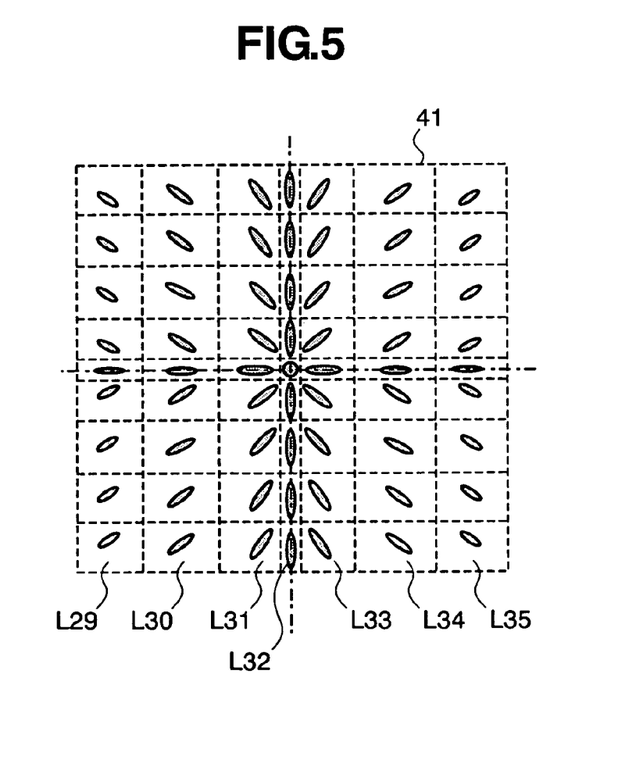
FIG. 5 is a view showing a distribution of light incident on a second array lens in the polarization conversion integrator.

FIG. 3 is a schematic view linearly showing the respective optical elements on the optical path of the illumination optical system covering a portion from the light source to the LC display element in the projection LC display according to the present invention described with reference to FIG. 2. FIG. 4 is an enlarged view showing optical paths of light rays incident on the central columns in the first array lens 3 shown in FIG. 1A. FIG. 5 is a view showing a distribution of light incident on the second array lens 4.

First, the distance between the first and second array lenses 3 and 4, and a method of obtaining the profiles of the respective lens cells of the first array lens 3 will be described here with reference to FIG. 3. As described in the summary section ("SUMMARY OF THE INVENTION") of this document, the corner-to-corner length of the display size of the image display element. 18 is denoted by si, the corner-to-corner length of the respective lens cell of the first array lens 3 is denoted by bi, the distance between the first and second array lenses 3 and 4 is denoted by L1$i$, and the distance between the collimator lens 6 and the image display element 18 is denoted by L2$i$. In this case, as expressed in equation 1, which is shown in the summary section, the size of the irradiation effective area formed on the image display element is substantially proportional to the size of the optical image of the lens cell of the first array lens 3.

The constituent lens cell of the first array lens 3 and the LC display element 18 are substantially in the relationship of analogy to one another. As such, in the case that the lateral width in the display size of the LC display element 18 is denoted by s'i, and the lateral width of the respective constituent lens cell of the first array lens 3 having the same aspect ratio is denoted by b'i, the ratio therebetween can be expressed as equation 2 given below.

$$s'i/b'i \approx L2i/L1i \qquad (2)$$

If the size (s'i) of the LC display element 18 is determined, also the distance L2$i$ from the collimator lens 6 to the LC display element 18 is substantially uniquely determined. Accordingly, the equation 2 can be modified to equation 2', as given below, by using s'i and L2$i$ as constants.

$$L1i/b'i \approx L2i/s'i \qquad (2')$$

In the present embodiment, the number of columns in the array lens is seven, such that the corner-to-corner length b'i of the respective lens cells of the first array lens 3 can be expressed as equation 3 given below where an effective range of the reflector 2 in the horizontal direction (Y-axis direction).

$$b'i \approx K/7 \qquad (3)$$

If the lateral width of the respective lens cell is determined, the profile of the respective lens cells is determined from the aspect ratio analogous to that of the LC display element. In addition, in accordance with the equations 2 and 3, the distance $L1i$ between the first and second array lenses 3 and 4 can be expressed as equation 4 given below.

$$L1i \approx (K/7) \times (L2i/s't) \quad (4)$$

Thus, the size of the respective lens cell of the first array lens 3 and the distance between the first and second array lenses 3 and 4 can be obtained.

Methods of obtaining the curvatures and curvature center axis positions of the respective lens cells of the first array lens 3 will be described hereinbelow with reference to FIG. 1A.

The curvatures of the respective lens cell of the first array lens 3 are determined so that light incident on the first array lens 3 is maximally collimated immediately before the opening portion of the polarization conversion element 5. The respective curvature center axis positions of the lens cells of the first array lens 3 are determined so that light rays L29 to L35 passed through respective lens cells of the first array lens 3 pass through the opening portions $55_1$ to $55_6$, as shown in FIG. 1. More specifically, the respective curvature center axis positions of the lens cells of the first array lens 3 are determined so that the light ray L29 passing through the first left column of the first array lens 3 passes through the opening portion $55_1$ of the polarization conversion element 5; the light ray L30 passing through the second left column of the first array lens 3 passes through the opening portion $55_2$ of the polarization conversion element 5; the light ray L31 passing through the third left column of the first array lens 3 passes through the opening portion $55_3$ of the polarization conversion element 5; the light ray L33 passing through the fifth left column of the first array lens 3 passes through the opening portion $55_4$ of the polarization conversion element 5; the light ray L34 passing through the sixth left column of the first array lens 3 passes through the opening portion $55_5$ of the polarization conversion element 5; and the light ray L35 passing through the seventh left column of the first array lens 3 passes through the opening portion $55_6$ of the polarization conversion element 5. The curvature center axis position of the light ray L32 passing through the fourth left column (central column) of the first array lens 3 is determined to match with an illumination optical axis center position of the illumination optical system. More specifically, as described in conjunction with FIG. 1, the curvature center axis position of the light ray L32 is determined so as to exist on the optical axis plane S100.

In the present embodiment, light rays split through three central columns in the first array lens 3 are incident through the second array lens 4 on two left and right columns sandwiching the center axis of the polarization conversion element 5. As such, the center of the curvature of the lens cell of the center column of the first array lens 3 matches with the direction of the illumination optical axis. The respective centers of the lens cells disposed in two sides sandwiching the center column are symmetric with respect to an axis in the center of the column line of the center column.

Also in the second array lens 4, light rays passed through three central columns are incident on two left and right columns sandwiching the center axis of the polarization conversion element 5. As such, similarly as in the first array lens 3, the center of the curvature of the lens cell of the center column of the second array lens 4 matches with the direction of the illumination optical axis. The respective centers of the lens cells disposed on two sides sandwiching the center column are symmetric with respect to an axis in the center of the column line of the center column.

With reference to FIG. 4, an optical path along which the light ray L32, which passes through the fourth left column (center column) of the second array lens 4, passes through the polarization conversion element. 5 will be described herebelow. As shown in FIG. 4, a part of the light ray L32, which passes through the fourth left column (center column) of the second array lens 4, is passed through an opening portion $55_3$ of the polarization conversion element 5 and is then polarization converted by a polarization conversion unit $50_3$. Concurrently, a part of the light ray L32 is passed through an opening portion $55_4$ and is then polarization converted by a polarization conversion unit $50_4$. The partial light ray passed through any one of the opening portions $55_3$ and $55_4$ is thus converted by the polarization conversion element 5 to the predetermined polarization to be a light ray for effective use.

The method of obtaining the profiles of the respective lens cells of the second array lens 4 will now be described herebelow with reference to FIG. 5. The curvature of the respective lens cell of the first array lens 3 is determined to permit an arc image an arc image of the lamp 1 to be formed on the second array lens 4. As such, as shown in FIG. 5, the light distribution in the position of the second array lens 4 is formed in which where arc images of the lamp 1 corresponding to the split number of the array lens are projected. In FIG. 5, numeral 41 denotes lens cells of the second array lens 4. In the present embodiment, the profiles of the lens cells arranged in the vertical center and the horizontal center are narrower than the profile of other lens cells.

Clearly from FIG. 1A, the curvature center axis of the respective constituent lens cell of the first and second array lenses 3 and 4 exists on the optical axis plane S100 formed of the extensional direction (X-axis direction, which is parallel to the short side of the LC display element) of the center column. As such, the light ray L32 passing through the center column of the second array lens 4 results in a distribution with a very narrow lateral width. The present embodiment is developed by drawing attention to the above-described distribution characteristics, in which also the lateral width of the profile of the lens cell of the center column of the second array lens 4 is narrow. With the narrowed profiles of the lens cells of the center column, the light rays L31 and L33 passing through the lens cells adjacent to the center column of the second array lens 4 can be passed through the respective opening portions $55_3$ and $55_4$ of the polarization conversion element 5. More specifically, in the case that the profiles of the respective lens cells 41 are determined to match with the profiles of the respective arc images of the lamp 1 which images are formed on the second array lens 4, the light from the light source can be efficiently passed through the polarization conversion element 5. The curvatures and the curvature center axis positions of the respective lens cells of the second array lens 4 are determined in accordance with the curvature of the collimator lens 6 to permit the light rays to be superposed and imaged on the LC display element 18.

In view of the fact that the light rays L31 (L33) and L32 are incident of the opening portion 553 (554) of the polarization conversion element 5, a width Wm of the constituent lens cell of the center column of the second array lens 4 is preferably two thirds or less of a width Wp of the opening portion 55. More specifically, suppose that light rays passing through the three central columns have lateral widths equal to one another. In this case, the necessary size of the respective cell of each of the three central columns in the second array lens 4 for passing through each of the two central columns in the polarization conversion element 5 is two thirds of the width Wp of the polarization conversion element 5. In practice, sine the light ray passing through the center column of the second array lens 4 is narrower in lateral width than the light ray passing through the adjacent column, the cell width Wm can be set to two thirds or less of the width Wp.

The embodiment has been described with reference to the example configuration in which the split number of the array lens in the vertical and horizontal directions are each larger than the number of columns in the polarization conversion element 5, and the profiles of the respective cells of the second array lens 4 in the vertical and horizontal directions are narrowed. However, the configuration is not limited to the embodiment configuration. For example, the configuration may be such that the split number of the array lens in any one of the vertical and horizontal directions is set larger than a corresponding number of columns in the polarization conversion element 5, and the profiles of only the center column in the direction with the larger split number are narrowed.

According to the configuration thus formed, the cell split number of the array lens can be increased concurrently with the minimized number of columns in the polarization conversion element 5. Consequently, the distance between the first and second array lenses 3 and 4 can be reduced, the illuminance nonuniformity and optical utilization efficiency can be improved, and the image display can be compacted.

Thus, the projection display can be provided in which the costs of the polarization conversion element are minimized, the illuminance nonuniformity and optical utilization efficiency can be improved, and the physical apparatus compactness can be accomplished.

What is claimed is:

1. A projection display, comprising:
   a light source;
   an image display element that forms an optical image by using light emitted by the light source;
   a projection lens that performs magnified projection of the optical image;
   a polarization conversion element that emanates light which is incident on the image display element, as polarized light and that includes a plurality of units arranged in an even number of rows along a first direction to be symmetric with respect to a center axis;
   a first array lens including a plurality of first lens cells that are arranged along a direction substantially parallel to the polarization conversion element and that are arranged in the first direction in an odd number of rows which is greater than the number of rows of the plurality of units; and
   a second array lens including a plurality of second lens cells that are arranged in the first direction in an odd number of rows respectively in correspondence to the first lens cells of the first array lens,
   wherein a width of a second lens cell of a center row in the first direction is narrower than widths of second lens cells of other rows.

2. A projection display according to claim 1, wherein, in the first array lens, first lens cells arranged on two sides of the center row in the first direction, respectively, have curvature center axes symmetric with one another with respect to an axis corresponding to the curvature center axis of the first lens cell arranged in the center row.

3. A projection display according to claim 1, wherein, in the second array lens, second lens cells arranged on two sides of the center row in the first direction, respectively, have curvature center axes that are symmetric with one another with respect to an axis corresponding to the curvature center axis of the second lens cell arranged in the center row.

4. A projection display according to claim 1, wherein light rays passing through the center row in the first direction and the second lens cells on two sides of the center row pass through two units of the plurality of units, the two units being respectively arranged in two columns sandwiching the center axis.

5. A projection display according to claim 1, wherein:
   the plurality of units are arranged in a plurality of columns symmetric with respect to the center axis in the first direction;
   the plurality of first lens cells are arranged in the first direction in an odd number of columns which is greater than the number of columns of the plurality of units; and
   the plurality of second lens cells are arranged in the first direction in an odd number of columns respectively in correspondence to the first lens cells of the first array lens.

6. A projection display according to claim 1, wherein a relationship of $$Wm \leq 2/3 Wp$$

is satisfied, where Wm is a width of the second lens cell in the center row in the first direction, and Wp is a width of an opening portion of the polarization conversion element.

7. An optical integrator usable in a projection display, comprising:
   a first array lens including a plurality of first lens cells arranged in a first direction in an odd number of rows; and
   a second array lens including a plurality of second lens cells that are arranged in the first direction in an odd number of rows respectively in correspondence to the first lens cells of the first array lens, wherein a width of a second lens cell of a center row in the first direction is narrower than widths of second lens cells of other rows;
   wherein the plurality of first lens cells are arranged in the first direction in an odd number of columns; and
   wherein the plurality of second lens cells are arranged in the first direction in an odd number of columns, wherein a width of a second lens cell in a center column in the first direction is narrower than widths of other second lens cells.

8. A projection display, comprising:
   a light source;
   an image display element that forms an optical image by using light emitted by the light source;
   a projection lens that performs magnified projection of the optical image;
   a polarization conversion element that emanates light which is incident on the image display element, as polarized light and that includes a plurality of units arranged in an n columns (n =positive integer) along a first direction;
   a first array lens including a plurality of first lens cells that are arranged along a direction substantially parallel to the polarization conversion element and that are arranged in the first direction in at least an n+1 rows; and
   a second array lens including a plurality of second lens cells that are arranged in the first direction in at least n1 columns respectively in correspondence to the first lens cells of the first array lens, wherein light rays emanated from, a plurality of certain second lens cells adjacent to one another, of the second lens cells, are incident on one of the plurality of units.

9. A projection display according to claim 8, wherein:
   the polarization conversion element includes the plurality of units arranged line-symmetric in an even number of rows along the first direction;
   the second array lens includes second lens cells arranged in an odd number along the first direction; and the plurality of certain second lens cells adjacent to one another are second lens cells arranged in three central columns along the first direction, and light rays passing through the second lens cells arranged in the three central columns are incident on a plurality of units arranged in two central columns in the polarization conversion element.

10. A projection display according to claim 8, wherein:
the plurality of units are arranged in a plurality of columns symmetric with respect to the center axis in the first direction;
the plurality of first lens cells are arranged in the first direction in an odd number of columns which is greater than the number of columns of the plurality of units; and
the plurality of second lens cells are arranged in the first direction in an odd number of columns respectively in correspondence to the first lens cells of the first array lens.

11. A projection display according to claim 1, wherein a relationship of $$Wm \leq 2/3 Wp$$

is satisfied, where Wm is a width of the second lens cell in the center row in the first direction, and Wp is a width of an opening portion of the polarization conversion element.

\* \* \* \* \*